US006665715B1

(12) United States Patent
Houri

(10) Patent No.: US 6,665,715 B1
(45) Date of Patent: Dec. 16, 2003

(54) METHOD AND SYSTEMS FOR LOCATING GEOGRAPHICAL LOCATIONS OF ONLINE USERS

(76) Inventor: Cyril Houri, 301 E. 79th St., Apt. #32N, New York, NY (US) 10021

( * ) Notice: Subject to any disclaimer, the term of this patent is extended or adjusted under 35 U.S.C. 154(b) by 0 days.

(21) Appl. No.: 09/541,938

(22) Filed: Apr. 3, 2000

(51) Int. Cl.$^7$ .............................................. G06F 15/16
(52) U.S. Cl. .................. 709/223; 709/217; 709/219; 709/225; 709/204; 709/229
(58) Field of Search ................. 709/223, 217, 709/219, 225, 229, 204

(56) References Cited

U.S. PATENT DOCUMENTS

| | | | | |
|---|---|---|---|---|
| 5,185,860 A | * | 2/1993 | Wu .............................. | 709/224 |
| 5,675,741 A | * | 10/1997 | Aggarwal et al. .......... | 709/242 |
| 5,835,720 A | * | 11/1998 | Nelson et al. ............... | 709/224 |
| 5,944,790 A | * | 8/1999 | Levy ........................... | 709/218 |
| 5,948,055 A | * | 9/1999 | Pulsipher et al. ........... | 709/202 |
| 5,948,061 A | | 9/1999 | Merriman et al. .......... | 709/219 |
| 6,151,631 A | * | 11/2000 | Ansell et al. ................ | 709/229 |
| 6,289,341 B1 | * | 9/2001 | Barney .......................... | 707/6 |
| 6,377,987 B1 | * | 4/2002 | Kracht ......................... | 709/220 |
| 6,412,014 B1 | * | 6/2002 | Ryan ........................... | 709/245 |
| 6,425,007 B1 | * | 7/2002 | Messinger ................... | 709/224 |
| 6,507,869 B1 | * | 1/2003 | Franke et al. ............... | 709/224 |
| 6,508,710 B1 | * | 1/2003 | Paravia et al. ................ | 463/42 |

OTHER PUBLICATIONS

Digital Island website (www.digisle.net). Screen displays, Jun. 2000.
Digital Envoy website (www.digitalenvoy.com). Screen displays, Jun. 2000.
Ingeodesy website (www.ingeodesy.com). Screen displays, Jun. 2000.
VisualRoute website (www.visualroute.com). Screen displays, Jun. 2000.
NeoTrace website (www.neotrace.com). Screen displays, Jun. 2000.

* cited by examiner

Primary Examiner—Saleh Najjar
Assistant Examiner—Sahera Halim
(74) Attorney, Agent, or Firm—Sofer & Haroun, LLP

(57) ABSTRACT

A location tracking system for building a geographic location database of network nodes in a computer network includes a trace engine module configured to send trace Id commands to a plurality of user terminals. The user terminals are actively coupled to a server node so that the trace engine module is able to obtain IP address of each of the user terminals and its corresponding geographic location. A first database is configured to store IP addresses obtained by the trace engine module and their corresponding geographical locations. A second database is configured to store a set of physical connections between IP addresses obtained by the trace engine module. The system can then determine the geographical location of end user terminals who employ the database as previously populated.

22 Claims, 10 Drawing Sheets

US 6,665,715 B1

METHOD AND SYSTEMS FOR LOCATING GEOGRAPHICAL LOCATIONS OF ONLINE USERS

FIELD OF THE INVENTION

This invention relates to methods for locating geographical locations of users employing a computer network such as the Internet, and more specifically relates to methods for allowing Internet servers to locate geographical locations of end users who access such servers.

BACKGROUND OF THE INVENTION

The number of companies that conduct business over the Internet is increasing exponentially. Companies that provide on-line content to promote and provide their goods and services over the Internet have effectively opened their market to the entire globe. End users from many different states or countries can access a company's web site and obtain information and/or purchase products and services on-line.

The globalization of Internet businesses means that a company needs to cater its information and/or available products and services to many end users with different needs and preferences which are influenced by their geographical locations. A good or a service that may be relevant to a particular geographical location may be completely useless or undesirable in another geographical location.

Furthermore, many on-line advertisers who place advertisements such as banner ads on top or bottom of third party web pages continually strive to find improved ways to target their ads based on the end users' geographical locations. For example, placing an advertisement for goods and products suitable for one geographical location may be completely inappropriate for another geographical location. Without knowing the origin of an end user who views an online advertisement on a web page, it is impossible for an on-line advertiser to select the type of advertisement that is relevant to the end user's geographical location.

In many instances, both business providers and on-line advertisers also desire to determine the geographical location and the corresponding number of end users who have accessed their site or have selected a particular on-line advertisements in order to track the rate of responses to their advertisements and/or content and to improve their marketing strategies.

Thus, there is a need for a system and method that enables an on-line business provider to determine the geographical location of an end user who has accessed its web site in order to provide relevant information corresponding to that geographical location.

SUMMARY OF THE INVENTION

In accordance with one embodiment of the invention a location tracking system is employed to build a geographic location database of Internet network nodes along with their IP addresses and geographical location of each corresponding IP address. The database is configured to be updated and expanded. The update and expansion of the database may occur at predetermined times or on a continuous basis.

In order to compile the geographic location database, the location tracking system in accordance with one embodiment of the invention, locates on-line services that engage end-user interaction. A typical example of such an on-line service may include Internet Relay Chats (IRC), also known as chat rooms, or Internet instant messaging, geographically local newsgroups, etc.

In accordance with one embodiment of the invention, the location tracking system includes a tracing engine module that is configured in at least one instance to send a route identification command to all the end-users who are currently on-line. In response to the route identification command, the tracing engine module receives IP address numbers of all intermediary host computers that were employed in the route that dynamically connects the location tracking system to each of the end users. The location tracking system then obtains the geographical location of each end user that is currently on-line, based on the prior information that the user had provided.

In accordance with another embodiment of the invention, the location tracking system obtains from commercially available databases the IP addresses of all major Internet Service Providers in each region within the country, along with their URL addresses and corresponding geographic locations, and stores that information in the system's database.

The location tracking system, in accordance with one embodiment of the invention, includes a database management module that is configured to maintain a database of IP addresses with their corresponding geographical locations in accordance with a predetermined set of criteria as specified by the location tracking system. In response to the IP address information provided by the tracing engine module, the database management module associates each IP address with a geographical location.

In accordance with one embodiment of the invention, location tracking system stores only the IP addresses whose geographical information is known. However, in another embodiment of the invention, the association of an IP address with a geographic location is accomplished by employing a statistical analysis on the number of users connected to a particular host site and their corresponding geographical locations as obtained by the location tracking system. The location tracking system then stores that derived information in a IP address-geographic location database.

In accordance with another embodiment of the invention, the location tracking system obtains IP addresses of backbone computer nodes that are employed to direct information traffic via Internet. The identification and location of these backbone computer nodes are typically known. The database management module then generates a random list of IP addresses. In respond to each generated IP address, the trace engine module sends a route identification command in order to obtain the IP addresses of the intermediary computer nodes. The database management module then determines whether any of the intermediary computer nodes have already been identified as a backbone computer node. Thereafter, the database management module determines whether any of the IP addresses in the random list matches an IP address connection to one of these backbone network nodes. If so the geographical location of the IP address can be calculated and the IP address-geographical location database gets populated. The location tracking system includes a database that stores the host name of the backbone network nodes so that the database management module can identify the geographical location of an IP address whose host name matches a stored host name.

In accordance with yet another embodiment of the invention, the location tracking system includes a database that stores host names or portions of host names and domain names of relatively well known host computers, such as universities, or large commercial enterprises, and backbone nodes, along with their corresponding geographical locations. When in response to a route identification command a set of IP address numbers are returned, location tracking system conducts a pattern matching function to determine whether any portion of the host name corresponding to the received IP address numbers matches a pattern stored in host name pattern database. If so, the system associates the returned IP address to a stored geographic location.

In accordance with another embodiment of the invention, the location tracking system obtains a directory of all local service providers in each region in the country. Thereafter, the location tracking system dials those local numbers and receives their IP address information in response to a route identification command. Since, the system had initiated a call to a known server location, IP address information received can be associated to that known server location.

In accordance with another embodiment of the invention, once the IP address-geographic location database has been sufficiently populated, the location tracking system can be employed by a plurality of on-line business providers or advertisers. A link command is embedded in the web pages of a participating on-line business provider or advertiser. In response to a user who downloads the webpage of the participating merchant, the link command directs the location tracking system to estimate the geographical location of the end user.

In accordance with one embodiment of the invention, the location tracking system employs its trace engine module to send a route identification command to the end user so as to obtain the IP addresses of all the computer nodes employed in connecting the end user to the Internet. The database management engine then matches the IP address of the server that is directly connect to the end-user's computer to an IP address in the IP address-geographic location database. If a match is found, the end-user's geographical location is then estimated. Thereafter, the location tracking system sends a command to a URL switch command module, so as to send the appropriate URL to the end user based, among other things, on the estimated geographical location of the end user.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE DRAWINGS

Figure 1A:
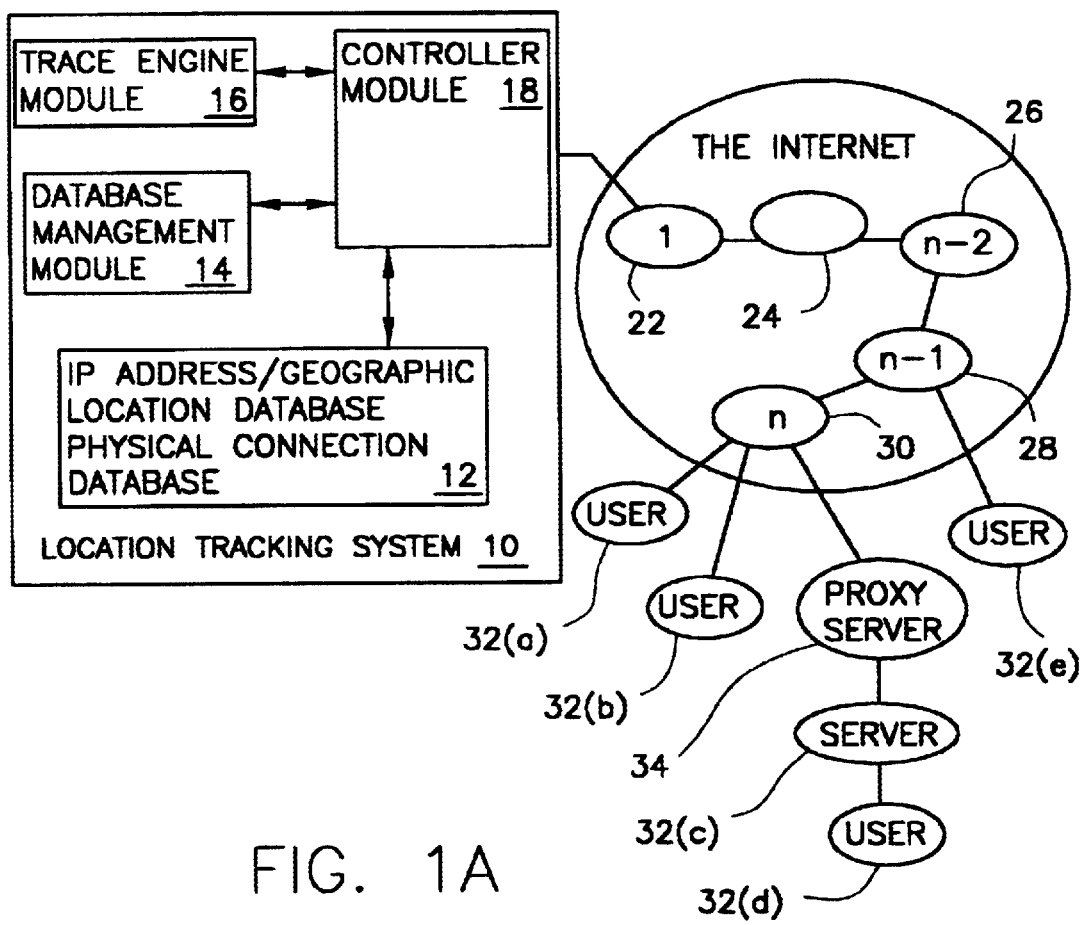
FIG. 1(a) illustrates a block diagram of a location tracking system in accordance with one embodiment of the present invention.

FIG. 1(a) illustrates a location tracking system 10 in accordance with one embodiment of the present invention. Location tracking system 10 includes various components that are employed to create a database of a plurality of IP addresses and their corresponding geographical locations. Location tracking system 10 also includes components that are employed to retrieve information about the geographical location of a target computer node or host system. It is noted that although these components are described to be located in one physical unit such as system 10, in accordance with other embodiments of the invention, they can be located in various locations remote from each other.

Location tracking system 10, in accordance with one embodiment of the invention is coupled to a computer network, such as Internet 20, comprising a plurality of computer nodes, such as 22, 24, 26, 28, 30, etc. A plurality of user computers 32 are also coupled to the computer network, allowing a corresponding number of end users access Internet 20. It is noted that an exemplary computer node 32(c), in accordance with one embodiment of the invention functions as a server to which other end user computer terminals may be connected in order to access Internet 20.

It is noted that each network node on the Internet (also referred to as a host) has a number assigned to identify it to other hosts. The numbers are in four parts, such as "nnn.nnn.nnn.nnn." These numbers are also known as IP addresses. Any computer of any kind, attached to Internet 20 is assigned a host number or IP address. Some of these host numbers are static and others are dynamic. The static host numbers are typically assigned to those computers that act as servers for allowing access to other computers, such as individual PCs. The dynamic host numbers or IP numbers, as the name suggests, are assigned dynamically to those computers that are not constantly connected to Internet 20. Internet hosts also have a host name, which is typically selected by the owner of each host, and includes the domain name and some geographical information. Each IP or host number may have a corresponding domain name, which allows remembering a host address more easily than remembering a host number.

In the United States, many computer nodes or hosts have names that associate their geographic U.S. zone, which is mostly organized by the city and state name. Furthermore, in many other countries, the domain names include a two-letter country abbreviation code corresponding to the country in which the host computer is located. As will be explained in more detail, the location tracking system of the present invention employs a pattern matching function to identify the geographic location of a network node based on the patterns detected from the host name.

Referring back to FIG. 1(a), location tracking system 10 includes a controller module 18, such as a computer, which is configured to control the operation of the system. It is noted that although FIG. 1(a) illustrates various modules in the location tracking system, the invention is not limited in scope in that respect. For example, other hardware or software configurations may be implemented to accomplish the functions provided by each of the components described in reference with FIG. 1(a).

Location tracking system 10 also includes a trace engine module 16 which is coupled to controller module 18 and is configured, among other things, to send route identification commands to end user terminals 32 via Internet 20 so as to determine the IP addresses of all computer nodes or hosts that define a network route between a user and the location tracking system. For example a route between location tracking system 10 and end user 32(a) may comprise at least n different hosts, where n is an integer. In this example, user 32(a) is connected to host 30, which is the nth node in the network route. Host 30, in turn is coupled to host 28, which is the (n−1)th node in the network route. Host 28 is coupled to host 26, which is the (n−2)th node in the network route. The nodes are thereafter, via other intermediary nodes, connected to the second node 24 and first node 22 in the network route.

It is noted that a connection between two hosts can be defined by different network routes, depending on network traffic conditions, connecting line conditions and other Internet protocols. A route between two nodes is defined by assigning a plurality of hosts that relay information between the two nodes. Typically, a defined route between two nodes remains the same during a communication session, unless one or more computers within the route experience a change in traffic or other network conditions.

Location tracking system 10 also includes a database management module 14 coupled to controller module 18. The database management module manages the operation of a database 12 referred to as location tracking system database. In accordance with one embodiment of the invention, database management module 14 retrieves the IP addresses of hosts obtained by trace engine module and assigns a geographic location to the IP addresses based on predetermined database rules as explained in more detail below. Once, the geographic location of an IP address is determined, the information relating to that IP address is stored in database 12.

In accordance with one embodiment of the invention, location tracking system database 12 includes an IP address/ geographic location table 6, which stores the IP addresses of a substantial portion of nodes on Internet 20 along with their corresponding geographic locations. Database 12 also includes an IP address/physical connection table 8, which stores the existence of physical connections between two or more nodes on Internet 20. For example, in accordance with one embodiment of the invention, table 8 includes a connection flag field that indicates the existence of an actual physical connection between two or more nodes and IP address Id field that identifies the IP addresses of the nodes that are connected. Location tracking system 12 also includes a host name pattern database 11 that stores textual patterns corresponding to known host names and their corresponding geographic locations. These textual patterns are sufficient to identify the geographical location of an IP address that has a host name that matches the textual patterns stored in database 11. Database 11, advantageously, also stores a list of geographical abbreviations, each of which is associated with at least one of said textual patterns.

In accordance with one embodiment of the invention, physical connection table 8 also stores the order of connection of two nodes in an upstream or downstream arrangement. Preferably, a downstream direction is from location tracking system towards the end user terminal, and conversely, an upstream direction is from the end user terminal towards the location tracking system. Based on this arrangement it is possible to determine, for example, all the nodes that are connected downstream to an intermediary node. These will be the nodes that are closer to end user terminals. Conversely, for example, it is possible to determine all the nodes that are connected upstream to an intermediary node. These will be the nodes that are farther away from an end user terminal.

It is noted that location tracking system 10 operates in couple of modes in accordance with one embodiment of the invention. For example, in a database mapping mode, location tracking system 10 operates to map database 12 with a plurality of IP addresses and their geographic locations. As will be described in more detail, location tracking system employs a plurality of various exemplary techniques to obtain the geographic location of each IP address to be stored in its database. Location tracking system 10 also operates in a location estimation mode in order to estimate the geographic location of an end user that employs the services of the system as will be explained in more detail.

Figure 2:
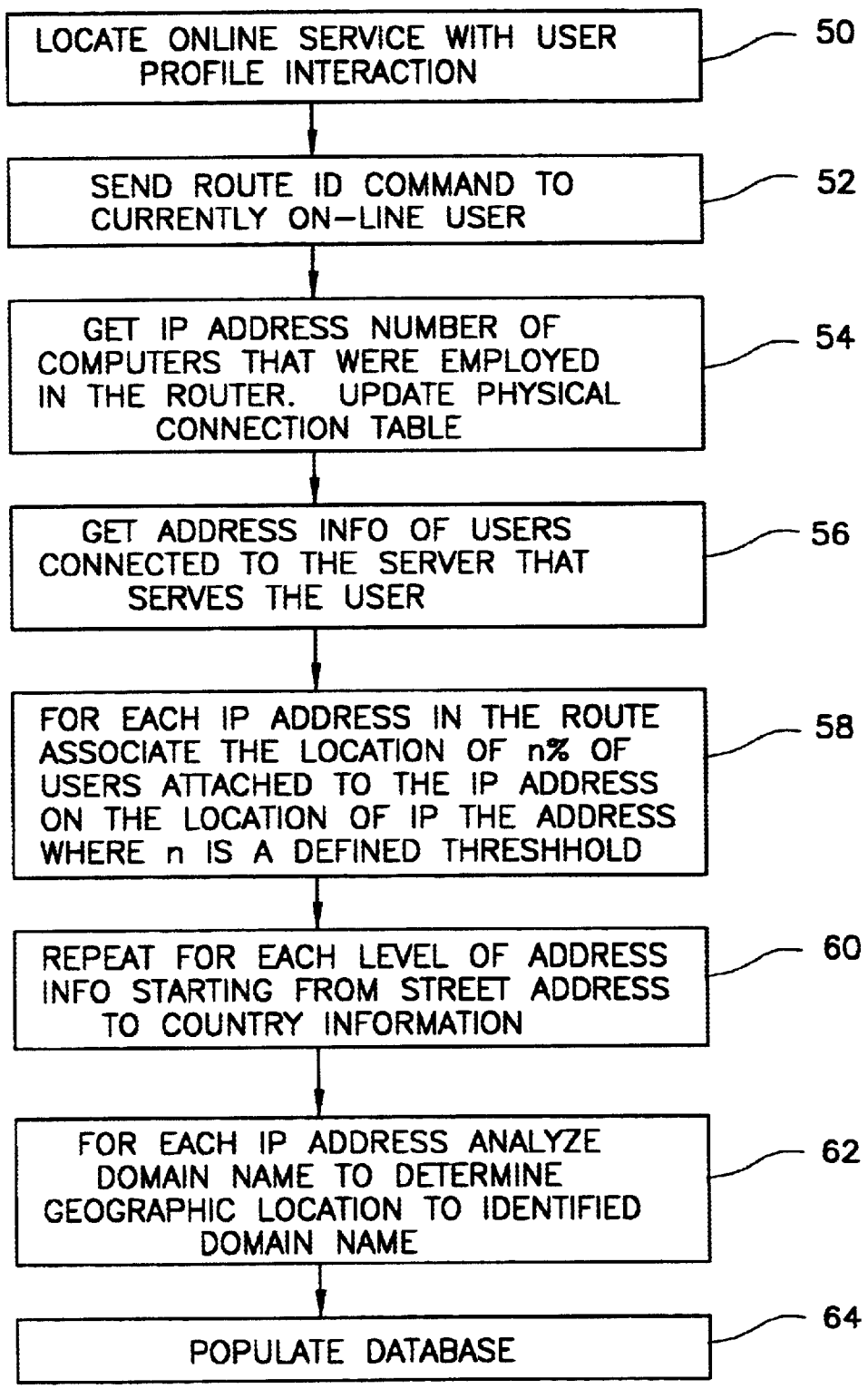
FIG. 2 is a flow chart illustrating the operation of location tracking system populating an IP address-geographical location database in accordance with one embodiment of the present invention.

FIG. 2 is a flow chart explaining one process to determine the geographic location of various IP addresses so as to populate database 12 in accordance with one embodiment of the invention. At step 50, location tracking system 10 locates an on-line service where a plurality of users are interacting. Preferably, many of the users have also provided their geographic location during such interaction. One example of such a user interaction may be the situation where many users are participating in an Internet Relay Chat (IRC) service, although the invention is not limited in scope in that respect. Thus, any Internet service wherein the IP addresses of the end users can be determined along with their geographical locations can be employed in the process described in the flow char of FIG. 2.

As is well known, an Internet Relay Chat service provides a way of communicating in real time with people over the Internet. Typically, a chat session may employ various networks of IRC servers that allow users to connect to the service. An example of such a network is Efnet, which often has more than 32000 people connected at once. Other examples of chat networks include Undernet, IRCnet, DALnet and Newnet. Once connected to an IRC server on an IRC network, users join one or more channels to converse with other participants in a channel. In many occasions, users employ a nickname to join in a chat session as a participant. They also provide some profile information about themselves, such as their city, state and country information.

At step 52, trace engine module 16 of location tracking system 10 (FIG. 1) sends a route Id. command to each on-line user in a chat session so that at step 54 the system is enabled to map the network route that defines a connection between an end user and location tracking system 10.

Therefore, at step 54, the location tracking system 10 sets up a list of IP address numbers of all the host nodes that were employed in the network route defining a connection between a user and location tracking system 10.

Figure 1B:
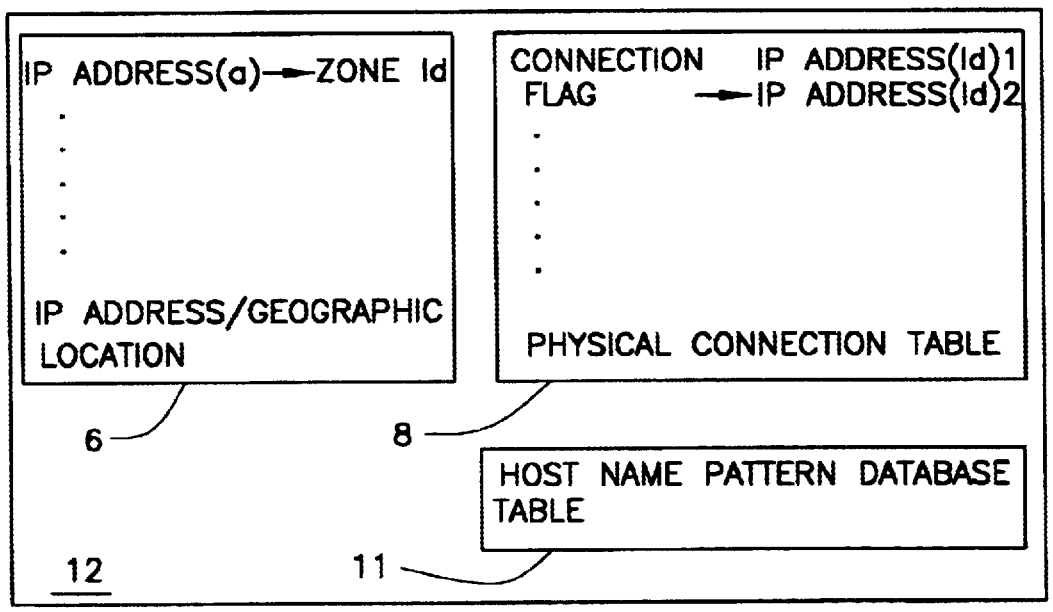
FIG. 1(b) illustrates a block diagram of a database employed by a location tracking system in accordance with one embodiment of the present invention.

Furthermore, the IP addresses identified in response to the route Id. command are stored in the IP address/ physical location table 8 (FIG. 1(b)). It is noted that even if the geographic location of an IP address has not been identified, table 8 can still be populated based on the connection of the nodes that have been identified in response to route Id. command. For example, if a route Id. command provides a set of nodes n connected to n−1 connected to n−2 connected to n−m, wherein n and m are integers, table 8 indicates that node n with its corresponding IP address is connected to node n−1 with its corresponding IP address and so forth.

At step 56, database management module 14 obtains the geographic location of the users who have been uncovered during step 54. At step 58, location tracking system 10 looks at each IP address, for example, starting with the dynamic IP address of an end user and proceeding to the IP address of a server computer that a user is directly connected to via for example a modem connection, and further proceeding to other hosts obtained in response to the route Id. command.

Each server with its corresponding IP address may have numerous connections to end users with their corresponding dynamic IP address and geographic locations. At step 59, physical connection database 8 stores all the connections from the end users to a corresponding server for later use, when the location tracking system is in the location estimation mode.

It is noted that in accordance with another embodiment of the invention, location tracking system 10 may also employ a statistical analysis to determine the geographical location of a server node based on the number of end users and their geographical locations connected to the server. Thus, there may be numerous dynamic IP addresses uncovered with their corresponding geographical location connected to the server. Location tracking system 10 determines the number of users connected to it. Database management module 14 (FIG. 1(a)) then determines the percentage of users connected to this IP address who are from the same geographic location. If the percentage is above a predefined threshold of n%, location tracking system 10 assigns that geographic location to the IP address and adds that information to database 12 also.

In the case of hosts connected to other hosts in a network route, for each host with an IP address, location tracking system 10 determines the number of hosts connected to it. Database management module 14 then determines the percentage of hosts connected to this IP address and who are from the same geographic location. If the percentage is above a predefined threshold, such as n%, location tracking system 10 assigns that geographic location to the IP address and adds that information to database 12.

It is noted that the geographic location obtained at step 56 may include a detailed level such as the street address of the user, or may include less detailed levels such as city, state and country information. At step 60, the process conducted at step 58 is repeated for each level of information until the percentage threshold for uncovering the same geographic location is satisfied.

For example, the system at step 58 determines the number of users or hosts from the same city who are connected to the same server uncovered at step 56. If the number of users or hosts from the same city satisfies the n% threshold, the system assigns that city name to the IP address of the host. If the number of users or hosts from the same city does not satisfy the threshold, the system then determines the number of users or hosts from the same state. If the number of users from the same state satisfies the n% threshold, the system assigns that state name to the IP address of a host. Similarly, if the number of users or hosts from the same country satisfy the threshold, the system assigns that country name to the IP address of the host.

Furthermore, at step 62, location tracking system 10, for each IP address uncovered in response to the route Id command, analyzes its host name to determine its geographic location. As mentioned earlier, some host names have a source identifier that corresponds to their geographic location. For example, IP addresses from universities may have a host name with the university abbreviation. For such IP addresses, the system just assigns the geographic location based on, for example, university abbreviation. These university abbreviations are stored in known textual patterns database 11, so that the system can determine the geographical location of a host node, whenever the node's host name matches the stored textual pattern.

An example of a pattern matching process of step 62 includes the situations when a host name includes a domain name. In many instances, companies with a large network, identify their various host names by abbreviations of geographical location where a host is located along with their domain names. For example, a host name may be "router1.city.state.XYZ.com", wherein "router1" refers to a network node within the company's network, city and state refer to the geographical location and XYZ.com refers to the domain name of the company. Location tracking system stores the domain name of such large networks, along with their corresponding cities and states, or their abbreviations, wherein the network nodes of the company reside. Thus, when location tracking system 10 gets to step 62 of FIG. 2, database management module 14 checks the host name of an IP address, and if it matches with a previously stored host name or portions of the host name it assigns the right geographical location to that host name based on the city and state abbreviation.

It is noted that although the flow chart in FIG. 2 is described in reference with an Internet Relay Chat environment, the invention is not limited in scope in that respect. For example, other user on-line interaction sessions may also be employed. Another example may be instant messaging environments, where a plurality of users interact with each other. Other examples, may include local news groups, wherein a plurality of users from the same geographic region join a news group to send and receive information about a topic of interest common to that geographic region. For such local news groups, location tracking system 10 first determines the IP address of the server where the messages for the news group was pushed from. Thereafter, location tracking system 10 sends IP route Id commands to end users who have accessed the newsgroup. The geographic location of each user accessing the newsgroup is then obtained. If a predetermined threshold of users from the same geographic location are connected to the same node, that node is assigned with the common geographic location.

Figure 3:
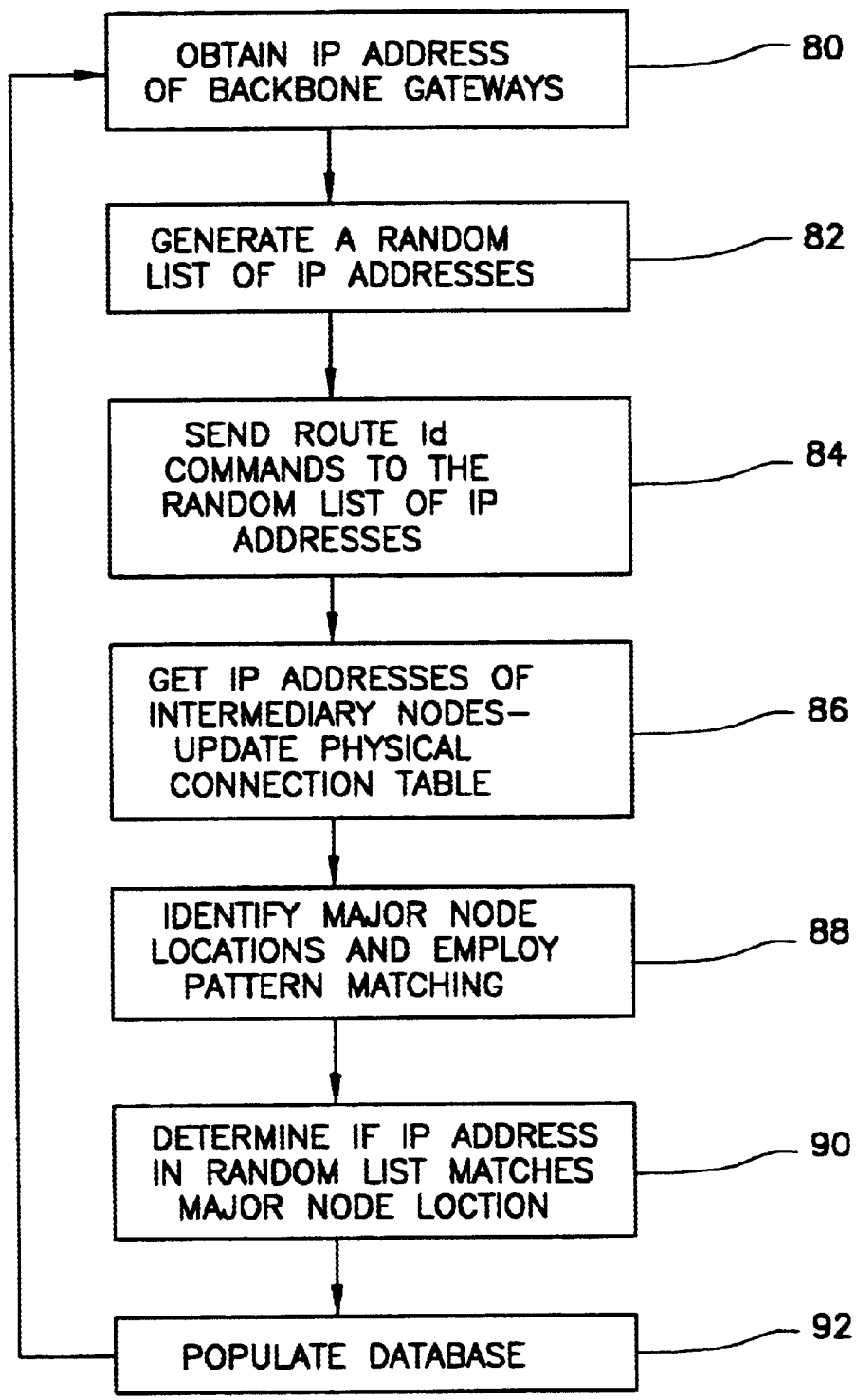
FIG. 3 is a flow chart illustrating the operation of location tracking system populating an IP address-geographical location database in accordance with another embodiment of the invention.

FIG. 3 is a flow chart that describes another process employed by location tracking system 10 to populate database 10. At step 80, location tracking system 80 obtains IP addresses of backbone gateway nodes. This information is publicly available. Typically such backbone gateway nodes are connected to a large number of nodes from the same geographic location. The host name of such backbone nodes include a geographic abbreviation code, such as the airport identification code of the closest airport. For example, the host name of a backbone node in New York may include a JFK abbreviation code corresponding to JFK airport.

Similarly, the host name of a back bone node in Los Angeles may include a LAX abbreviation code corresponding to LAX airport.

At step 82, location tracking system 10 generates a random list of IP addresses. The list of random IP addresses can be generated in accordance with a random number generation arrangement as is well known to those skilled in the art.

At step 84, location tracking system 10 sends a route Id command to the random list of IP addresses generated at step 82. These addresses may or may not belong to actual physical nodes. However, for those nodes that have the same IP address as the one generated at step 84, the system receives a corresponding response.

Thus, at step 86, the system obtains the IP addresses of all nodes between each of the nodes, having the same IP address as the random IP addresses, and location tracking system 10. Furthermore, the IP addresses identified in response to the route Id. command are stored in the IP address/ physical location table 8 (FIG. 1(*b*)). It is noted that even if the geographic location of an IP address has not been identified, table 8 can still be populated based on the connection of the nodes that have been identified in response to route Id. command. For example, if a route Id. command provides a set of nodes n connected to n−1 connected to n−2 connected to n−m, wherein n and m are integers, table 8 indicates that node n with its corresponding IP address is connected to node n−1 with its corresponding IP address and so forth.

At step 88, the system identifies IP addresses of backbone node locations. It also employs a pattern matching process as described in reference with FIG. 2 so as to assign a geographical location to the identified node location. At step 90, the system determines whether the IP addresses in the random IP list match the IP address of a node that is connected to a backbone node location. If so, the system assigns the geographic location of the random IP address to the geographic location of the backbone node and at step 92 populates database 12 (FIG. 1(*a*)) as such. The system continues this operation continuously until it is ended by location tracking system 10 whenever desired.

The geographic location of a substantial portion of IP addresses on Internet 20 can be determined based on the principles of the present invention as described above with reference to exemplary embodiments referred to in FIGS. 2 and 3. In accordance with another embodiment of the invention another example to obtain the geographical location of a network node is described in reference with FIG. 4.

Figure 4:
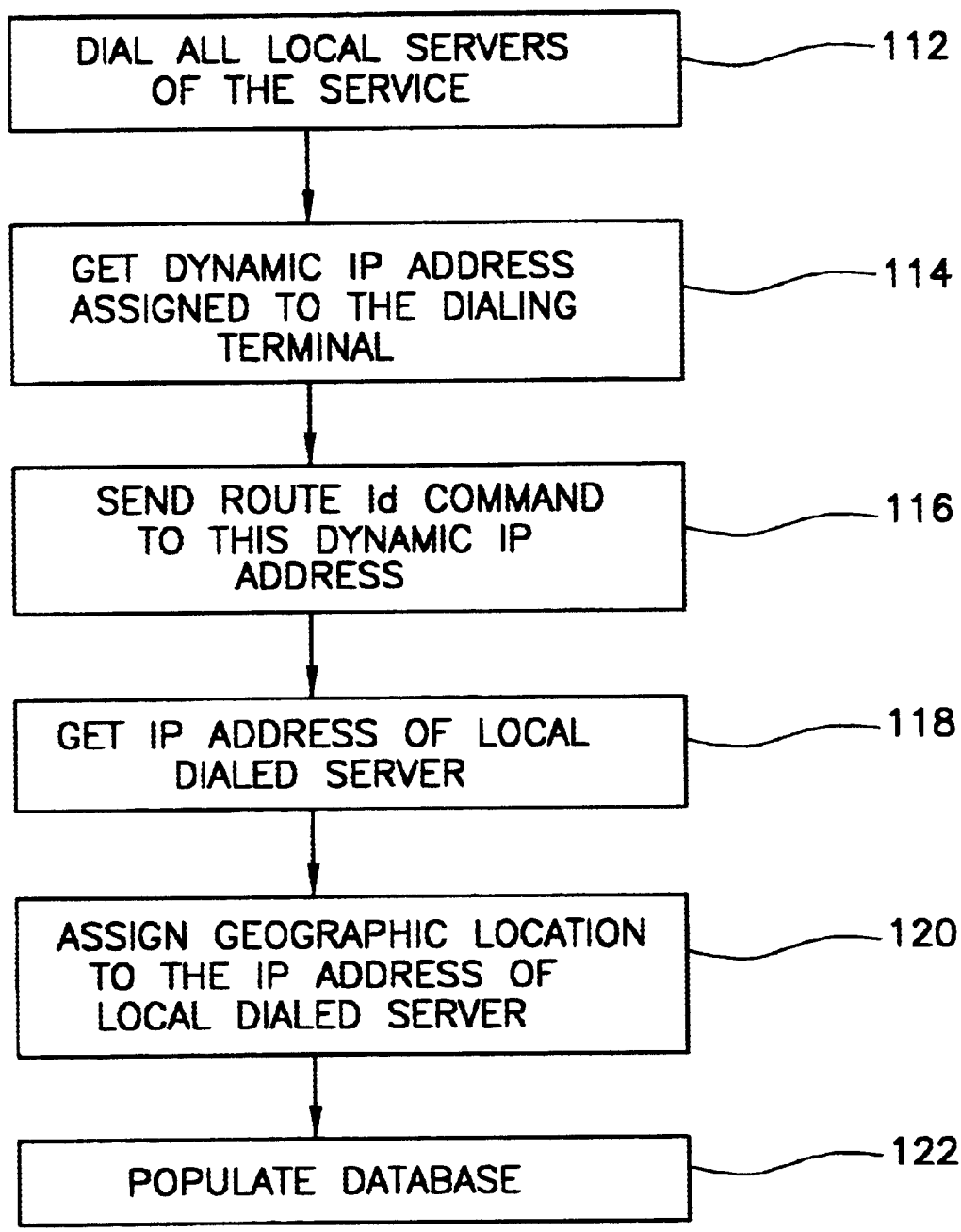
FIG. 4 is a flow chart illustrating the operation of location tracking system populating an IP address-geographical location database in accordance with another embodiment of the invention.

Location tracking system 10, at step 112 locates a plurality of major service providers along with a list of phone numbers for their local server nodes in each city. Location tracking system or a separate user terminal specified by location tracking system 10 dials a local server, such as 32(*c*) of a local server. It is noted that many service provides have a plurality of local servers in each major city in the United States and throughout major international cities. Thus, the process explained in reference with FIG. 4 is employed for each of these local servers.

It is also noted that location tracking system 10 or the user terminal that dials a local server will appear to the local server as a user of the system. In response to this connection, the local server assigns a dynamic IP address to the dialing terminal that dials the local server. Location tracking system 10, at step 114 obtains the IP address assigned to the dialing terminal. At step 116, location tracking system 10 sends a route Id command to the assigned dynamic IP address. In response to this route Id command, location tracking system 10, at step 118 obtains the IP address of the local server that was dialed by the dialing terminal. Based on the area code of the number dialed, location tracking system 10 assigns a geographic location to the IP address of the local server at step 120. At step 122, location tracking system 10 populates both tables 6 and 8 based on the information obtained in response to the route Id. command.

It is appreciated by those skilled in the art that the process of obtaining geographical locations of servers can also be employed in a situation where proxy servers are used. For such proxy servers, it is not possible to determine the IP address of the server to which a user is connected by just sending a route Id. command to a user. Typically, a user connects its terminal, such as 32(*d*) in FIG. 1(*a*), to a local server 32(*c*) that is in turn connected to the main proxy server, such as 34, via the Internet. The proxy server then functions as a gateway that allows the user to have access to Internet 20. The IP address of a user connected to such a proxy server is translated to the IP address of the node wherein the server is residing. For example, if a route Id command is sent to a user that is connected to the proxy server, the returned IP address will be the IP address of the proxy server which is located in a geographic location remote from the geographic location of the user. For proxy servers such as 34, location tracking system 10 employs the process to locate the geographic location of local server 32(*c*) that the user is connected to in accordance with one embodiment of the invention as described in reference with FIG. 4. Thus location tracking system 10 identifies a list of all local servers that are connected to the proxy server and dials those local servers that access the proxy server. Thereafter the system connects to the local server and acquires the geographical location of the local server as described in step 120.

Location tracking system 10 accumulates IP addresses and their corresponding geographic location and physical connections over time as discussed above. As such, database 12 is updated to remain current and increasingly populated as the number of IP addresses over the Internet grows. Once, a viable database is provided, location tracking system 10 can estimate the geographic location of a desired host or computer node referred to as a target host.

Figure 5A:
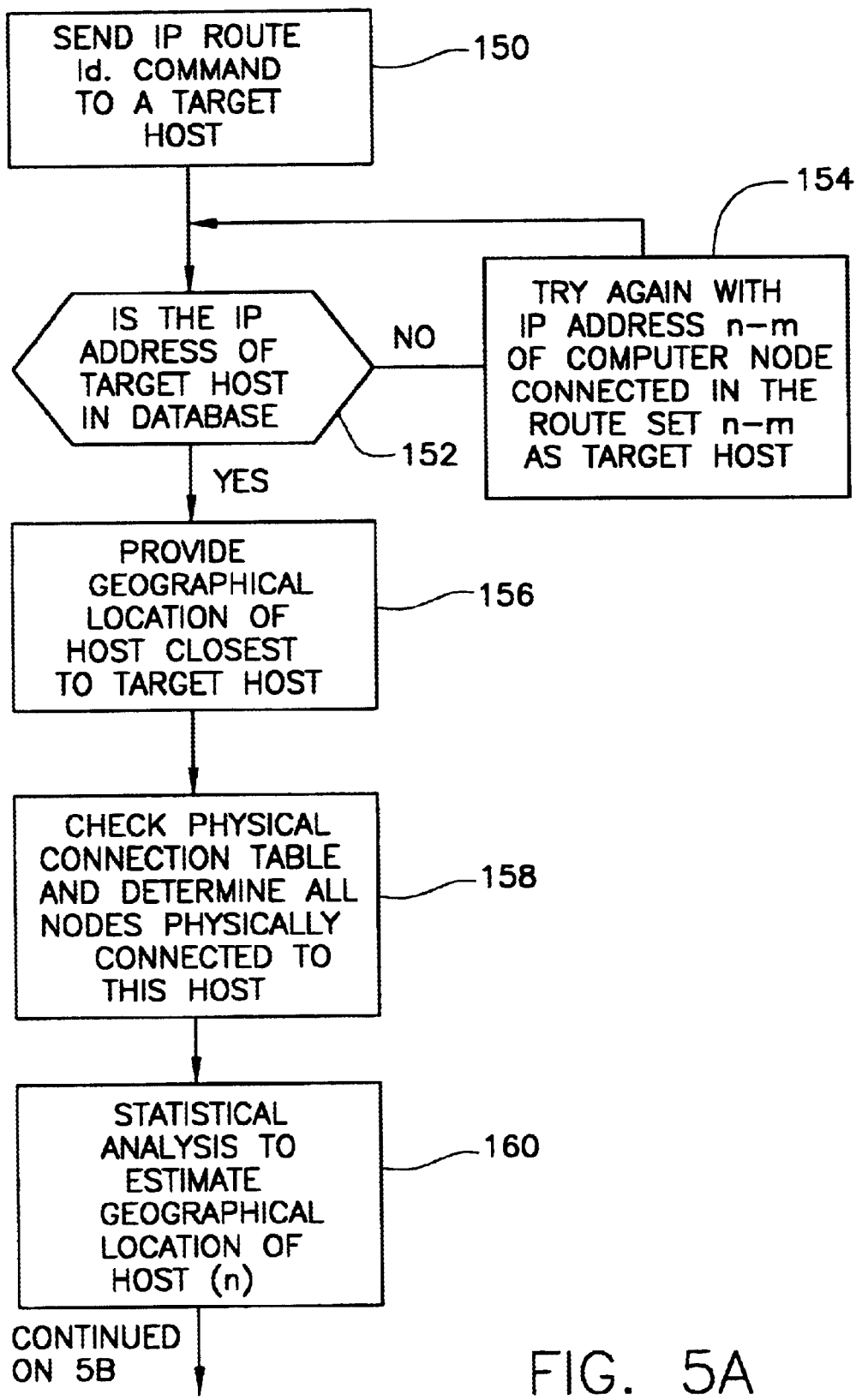
FIG. 5 is a flow chart illustrating the operation of location tracking system employing an IP address-geographic location database to determine the geographic location of a target host in accordance with one embodiment of the invention.

FIG. 5(*a*) is a flow chart describing the process of determining the geographic location of a target host (n) in accordance with one embodiment of the invention. Typically, a user terminal, referred to as target host (n+1), accesses location tracking system 10. Location tracking system 10 in turn attempts to determine the geographic location of the server connected to the user, identified as a target host (n).

At step 150, location tracking system 10 sends an IP route Id. command to the target host (n+1). At step 152 location tracking system 10 determines whether the IP address of the target host (n) is in database 12. If so, the system goes to step 156 and provides the geographical location of the end user or target host(n+1).

It is noted that in a preferred embodiment the target host (n) is the computer node that serves as a local server to an end user terminal. Typically, end users dials a local server within their own geographic location to access Internet 20. Thus, it is safe to assume that the geographic location of an end user connected to local server is the same as the geographic location of the local server.

If at step 152, the IP address of the target host(n) was not located in database 12, the system goes to step 154. The system then attempts to determine whether it has in its database the geographic location corresponding to the IP address of the node (n−1), which is connected to host (n). The system repeats this process, until it identifies an IP address n−m, where a corresponding geographic location is stored, where n and m are integers. As explained above, in a preferred embodiment target host (n) is the network node that acts as a local server to an end user terminal. Furthermore, step 154 is usually repeated once or twice. This follows because, for example, when the geographic location of a computer host that is more than two or three times removed from the target host is not stored in the system, chances that the geographic location of target host(n) can be accurately estimated decreases. Therefore, in a preferred embodiment m is set to either 1 or 2 to assure substantially accurate estimations of the geographic location.

Figure 6:
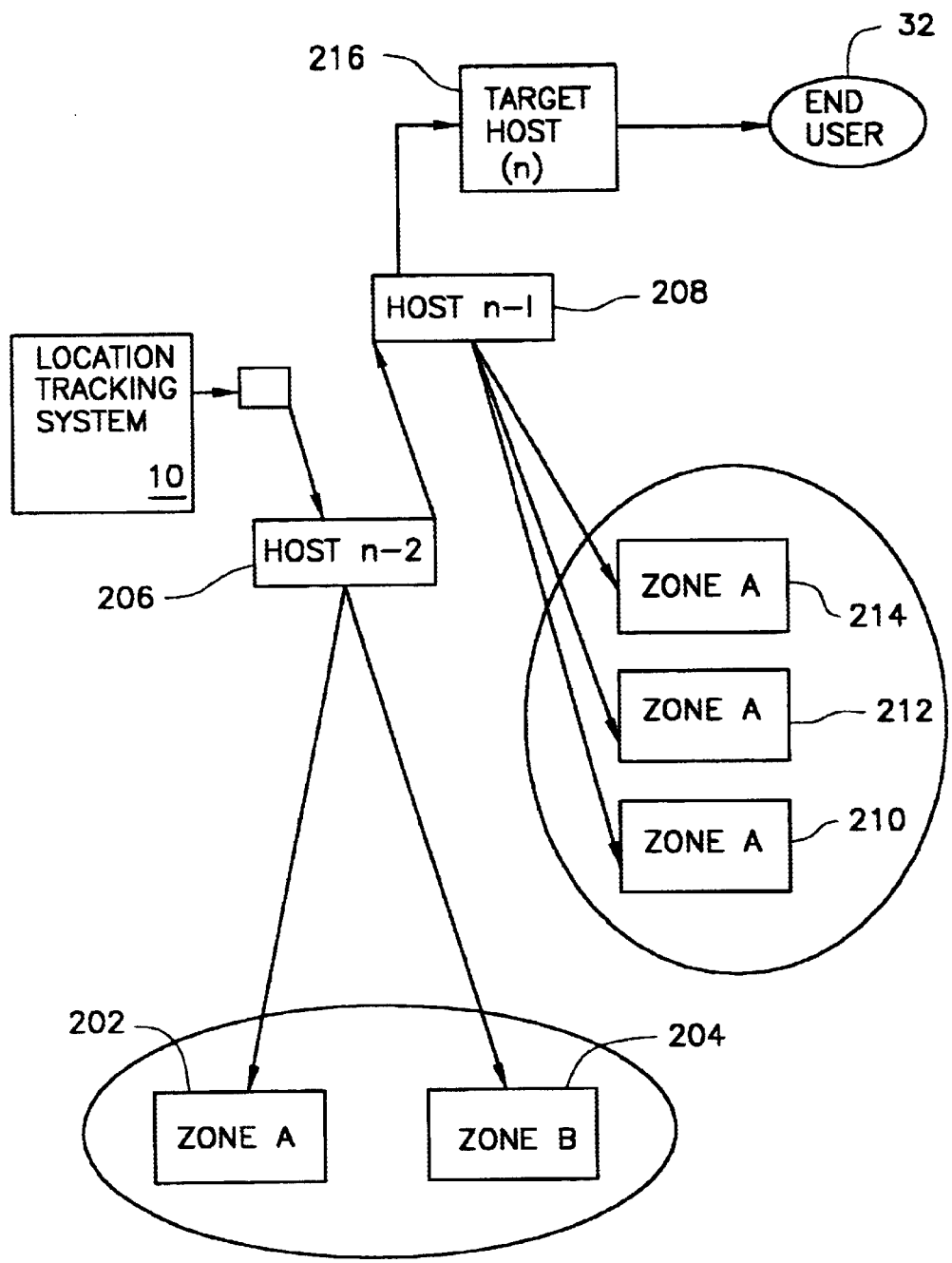
FIG. 6 illustrates an exemplary route diagram illustrating the operation of location tracking system in accordance with one embodiment of the invention.

At step 156 location tracking system 10 provides the geographic location of the host that is closest to target host (n). At step 158 location tracking system 10 checks physical connections table 8 and determines all IP addresses of computer nodes that were physically connected to this host, when location tracking system 10 was populating the database during the database mapping mode. At step 160, location tracking system 10 applies statistical analysis to estimate geographic location of host (n) as described in an exemplary situation illustrated in FIG. 6. Basically, location tracking system 10 looks at the geographical location of all connections to the server that serves a target host and applies some averaging operation to estimate the geographical location of the server.

Figure 5B:
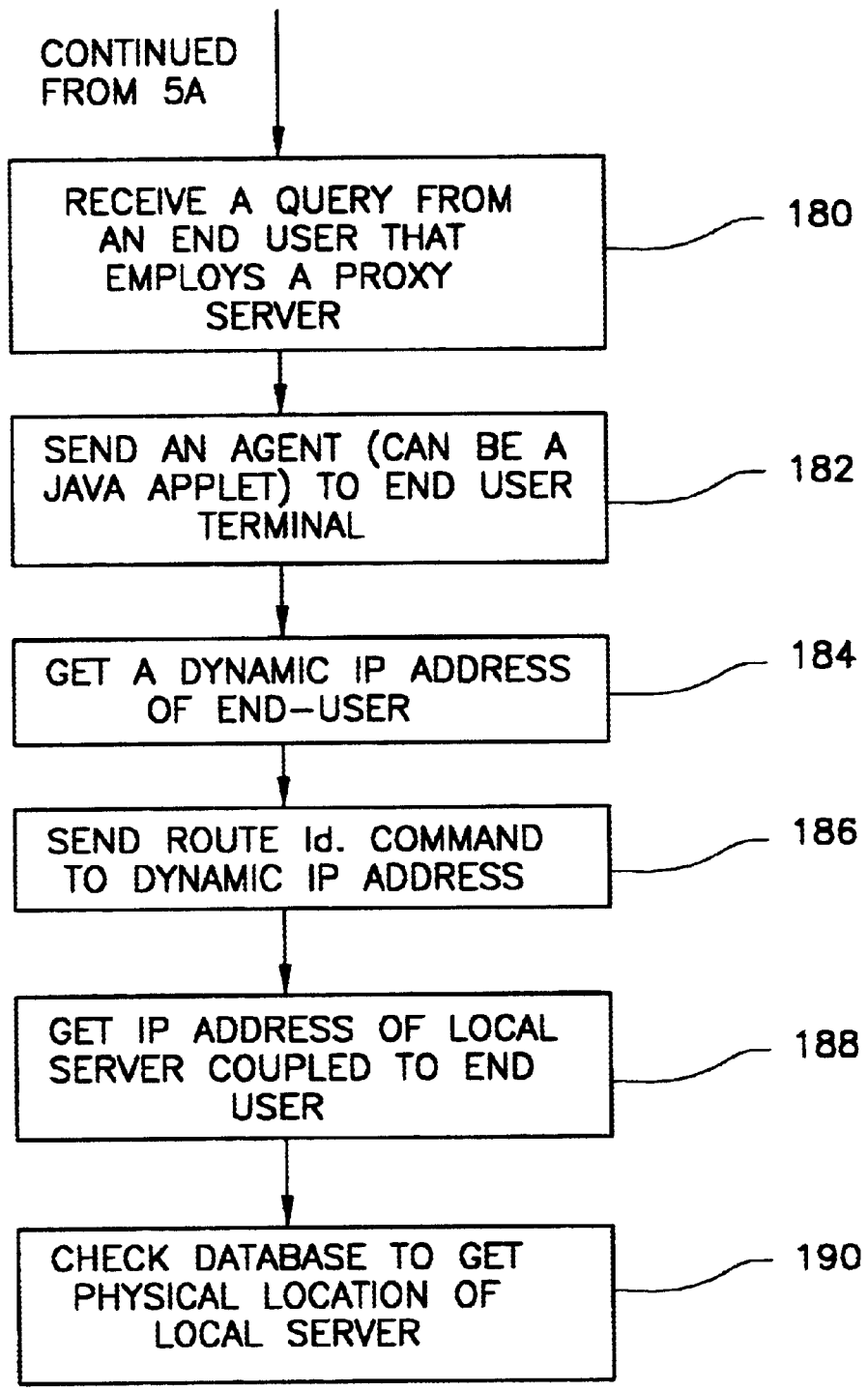

FIG. 5(b) is a flow chart of a process employed to determine the geographic location of an end user who employs a proxy server service in accordance with one embodiment of the invention. At step 180, location tracking system 10 receives a query from the end user. Typically, at this point the IP address identifying the end user is the IP address of the proxy server itself, rather than the dynamic IP address assigned to the end user. Therefore, it is preferable for location tracking system 10 to determine the dynamic IP address of the end user. To this end, at step 182, location tracking system 10 sends an agent, such as a Java applet to the end user to determine the dynamic IP address assigned to the end user.

The Java applet executes within the end user terminal and at step 184 provides the dynamic IP address of the end user terminal to location tracking system 10. In response to the received dynamic IP address, location tracking system 10, sends a route Id. command to that IP address. At step 186, location tracking system 10 receives the IP address of the local server coupled to the end user. The geographic location of this local server has been previously estimated in reference to the process described in FIG. 4. Therefore at step 190, location tracking system 10 checks its database to obtain the geographic location of the local server. The geographic location of the dynamic IP address of the end user is then assumed to be the same as the geographic location of the local server to which it is connected.

FIG. 6(a) illustrates an exemplary network route arrangement for which location tracking system 10 is employed to estimate the geographic location of a target host. As illustrated an end user 32 is linked to location tracking system 10 via a computer network such as Internet 20. As will be explained in more detail below the link between end user 32 and location tracking system 10 may be a direct hit from the end user to a website wherein location tracking system 10 resides. In the alternative the link between end user 32 and location tracking system 10 may be a connection to a different website, who in turn transmits the query from the end user to location tracking system 10 by forwarding the end user's IP address to the location tracking system. Such an indirect link between end user 32 and location tracking system 10 is defined as a virtual link.

In any event, the arrangement in FIG. 6(a) illustrates a situation wherein location tracking system 10 has acquired the IP address of end user 32 and in response to a route Id. command to that IP address has obtained the network nodes that connect the end user to location tracking system site. For this connection, end user terminal 32 is coupled to a local server 216 which is designated as the target host (n). Node 216 is coupled to node 208, which is designated as target host (n−2). Similarly, node 208 is coupled to node 206, which is designated as target host (n−2) and so forth. It is noted that each of the nodes defining the route between end user terminal 32 and location tracking system 10 are also coupled to other nodes.

As mentioned above, location tracking system 10 obtains the IP address of local server 216, or target host(n) and determines whether database 12 contains the geographic location corresponding to the IP address. If so, location tracking system 10 assumes that end user terminal 32 is located in the same geographic location as its local server.

In accordance with one embodiment of the invention, location tracking system 10 also confirms the validity of the geographic location of local server 216 as determined. To this end location tracking system 10 checks physical connection table 8 to obtain a list of all static IP addresses that have been connected downstream to local server 216. If the geographic location of a significant portion of nodes connected to this local server is the same as the geographic location of the local server, location tracking system issues a confirmation signal as to validity of the determined geographic location.

If however, location tracking system 10 does not contain the geographic location of target host (n), it checks to determine whether it contains the geographic location of target host (n−1) (node 208) as described above. If so, location tracking system 10 obtains a list of nodes downstream to node 208, such as 210, 212, and 214, to determine their geographic location. In accordance with one embodiment of the invention, if a significant portion of these nodes belong to the same geographic location, for example, zone A, the system assigns the same geographic location to target host (n). It is noted that there may be a plurality of various approaches to estimate the location of a host based on the geographic locations of other nodes physically connected to it. In another example, location tracking system 10 obtains a list of all the nodes connected to host (n−2) (node 206), and determines for example, that one node 202 is from zone A and another node 204 is from zone B, wherein zone A is a subset of zone A. In that instance, location tracking system 10 assigns zone B to host (n−2).

Furthermore, in accordance with another embodiment of the invention, in order to estimate the geographical location of node 216, location tracking system 10 identifies the IP addresses and geographical locations of all user terminals who had been previously connected to it when the system was operating in the database mapping mode. Based on these geographical locations the system then estimates the geographical location of node 216. For example if a significant percentage of nodes connected to node 216 were from the same geographical location, then location tracking system assigns the same location to node 216.

In the case of a user residing one node away from a server known by the system's database, the system may save the user's geographical location in the database in order to avoid an unnecessary route id command the next time this user connects to the server.

Figure 7:
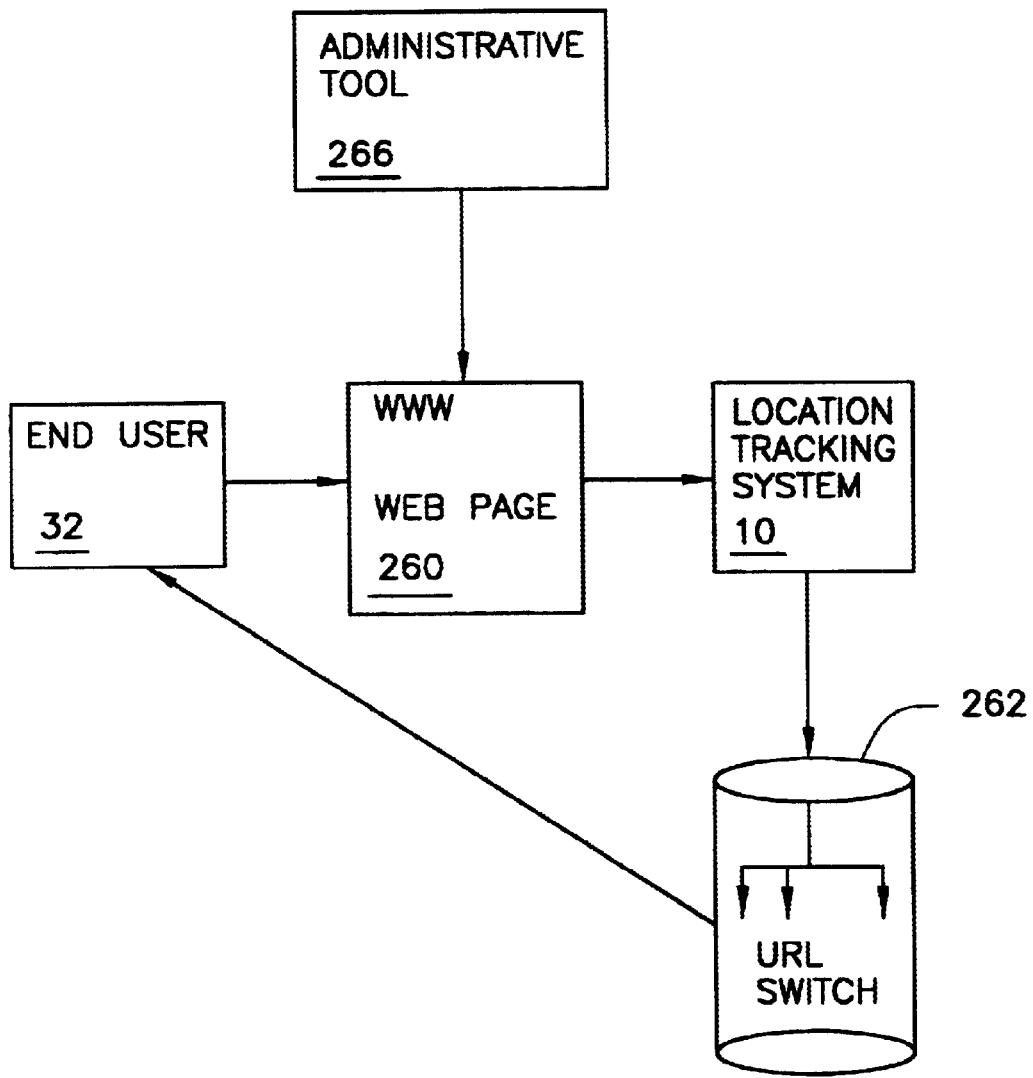
FIG. 7 illustrates a block diagram of a web site employing the location tracking system in accordance with one embodiment of the invention.
Figure 8:
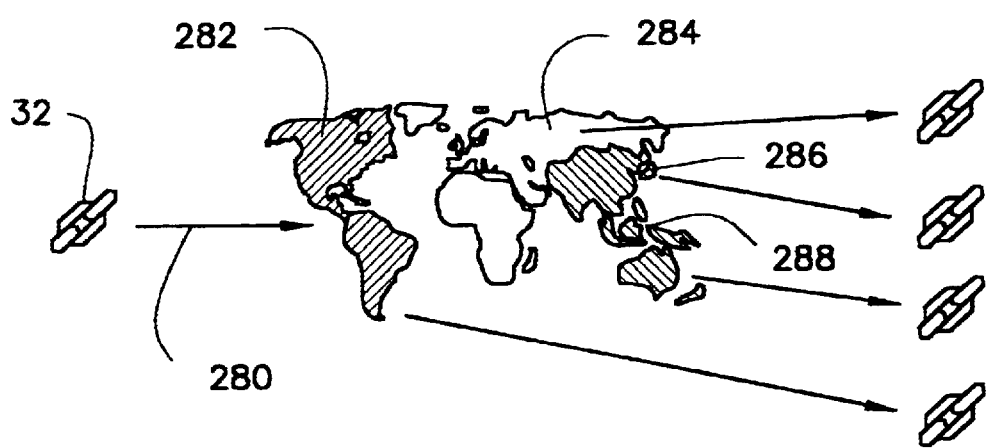
FIG. 8 illustrates a plurality of zones serviced by a web site employing the location tracking system in accordance with another embodiment of the invention.
Figure 9:
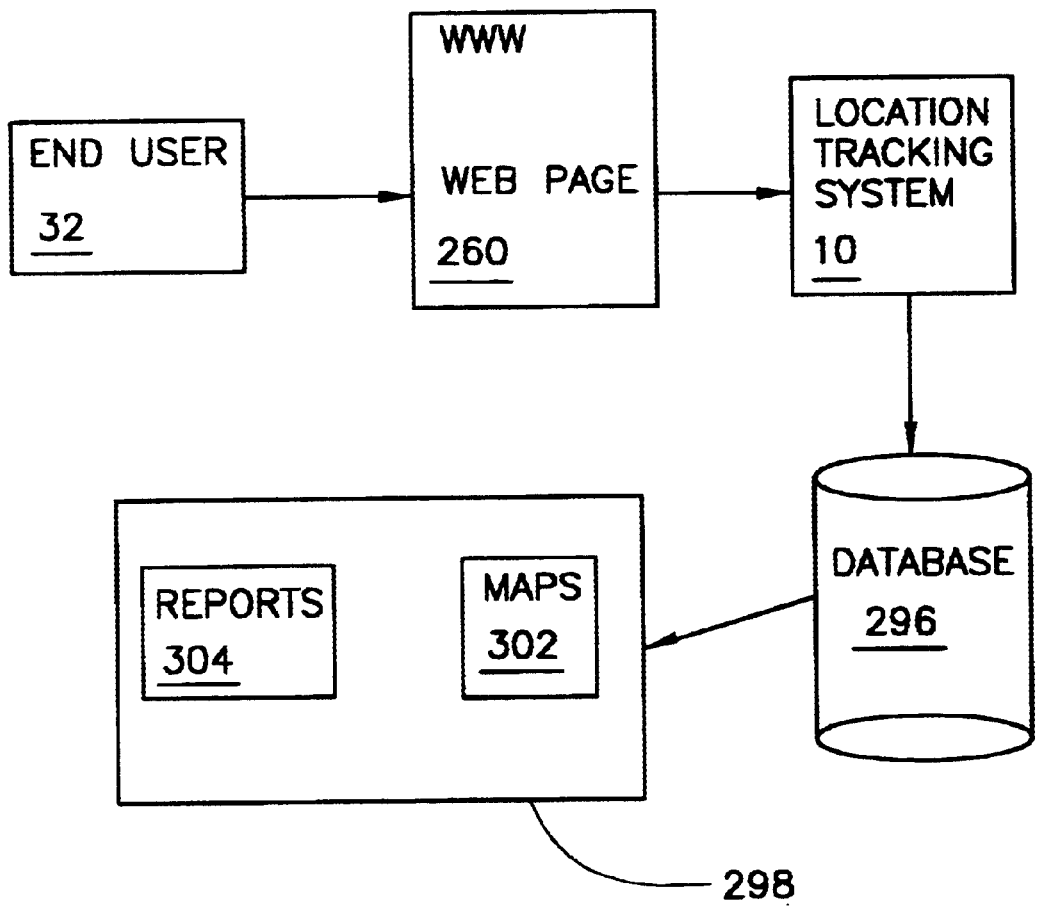
FIG. 9 illustrates a block diagram of a reporting system employing the location tracking system in accordance with one embodiment of the invention.

FIGS. 7 through 9 describe some of the exemplary applications that location tracking system 10 may be put into use. One application wherein location tracking system 10 can be used is the situation where a website can provide appropriate information corresponding to the geographic location of the user visiting the site. For example, a site that provides different information, goods or services to end users based on their geographic location may employ location tracking system 10 to obtain the geographic location of the end user and provide the appropriate information automatically. To this end FIG. 7 illustrates a block diagram of an arrangement wherein location tracking system 10, in accordance with one embodiment of the present invention may be employed. A website 264 is configured to operate on the Internet. Website 264 is configured to have access to location tracking system 10. In accordance with one embodiment of the invention, location tracking system 10 may be located remotely from website 264 or may be resident at website 264. Location tracking system 10 in turn has access to a URL switch 262. URL switch 262, in accordance with one embodiment of the invention, is a database that contains a list of all URL addresses that website 264 provides in accordance with the geographic location of the user that visits it.

During operation, an end user 32 accesses a homepage 260 of a website 264 via Internet 20. Website 264 has been previously configured by administrative tool 266 to forward the user's IP address to a location tracking system 10. Website 264 sends the dynamic IP address of user 32 to location tracking system 10. It is noted that, in accordance with other embodiments of the invention, various portions on a web page of website 264 can be configured to send user's IP address to a plurality of various location tracking systems 10. Location tracking system 10 in turn determines the geographic location of end user 32 based on the principles of the present invention such as those explained in reference with FIGS. 5 through 6.

In accordance with one embodiment of the invention location tracking system 10 provides this geographic location to URL switch 262, in response to which an appropriate URL address corresponding to the estimated geographic location is sent to end user 32. Preferably, this URL address is sent to a browser application that is employed by end user 32. This browser then uses the URL received from URL switch 262 to direct the browser to the web page identified by the URL. Thus, the user receives the proper URL based on the geographic location, without navigating through the web pages provided by website 264. An example for such a service may be national directories that provide local information based on local regions, such as restaurant guides, movie and entertainment guides, weather channels and so forth.

Thus, a web page may be divided into various portions, such as frames and banner portions, wherein each of these portions display information from a different URL. In such a situation, the website forwards the IP address of a user accessing the web page to a plurality of location tracking systems 10. For example, one location tracking system may be associated with an advertising content provider. Another location tracking system may be associated with a news content provider. Website 264 sends the user's IP addresses to each one of these location tracking systems to determine the geographic location of the user, and to provide the appropriate URL to the user's browser so that the corresponding portion of the web page would receive the contents of this appropriate URL.

Furthermore, in accordance with one embodiment of the invention, a content provider may employ an administrative tool, such as 266, to define geographical zones for each web page or portions of the web page on its web site. For example, an entire page, a frame or just a banner on a page, may be defined to have a specified geographic zone. Therefore, as illustrated in FIG. 8 when a user accesses a pre-configured website a virtual link 280 is established between the user and the website. The website may be divided into a plurality of geographic zones, such as 282, 284, 286 and 288. Each of these geographic zones are associated with an actual physical link to the user in the form of a physical URL, contents of which is displayed in response to the virtual link.

FIG. 9 is a block diagram of a market reporting arrangement employing location tracking system 10 in accordance to one embodiment of the invention. As stated above website 264 may have a link to location tracking system 10. Thus, each time a user accesses a page on website 264, the link directs the user's IP address to location tracking system 10 so as to obtain the geographic location of the user. The geographic location of the user may also be stored in a database 296. This allows location tracking system 10, to generate maps 302 and periodical reports 304 illustrating the geographical dispersion of the website's clientele. These reports may be accessible both on-line or on printable format.

It is noted that although the embodiments discussed above employ IP addresses for the task of creating database 12 and employing the database for locating the geographic location of the users, in accordance with other embodiments of the invention, host names could also be used either instead of or in combination with the IP addresses.

Thus, in accordance with the present invention, a location tracking system is capable of determining the geographic location of end users that access a web site and based on that information provide a corresponding web page, frame or banner that is associated with a specified geographic location.

What is claimed is:

1. A location tracking system for building a geographic location database of network nodes in a computer network comprising:

a trace engine module configured to send trace Id commands to a plurality of user terminals, wherein said user terminals are actively coupled to a server node and said trace engine module obtains IP address of each of said user terminals and its corresponding geographic location, a first database configured to store IP addresses obtained by said trace engine module and their corresponding geographical location; and a second database configured to store a set of physical connections between IP addresses obtained by said trace engine module.

2. A location tracking system in accordance with claim 1, wherein geographic location of each of said user terminals is stored in a user profile record, previously provided by a user of said user terminal.

3. A location tracking system in accordance with claim 2, wherein said first database stores a information corresponding to a plurality of Internet service providers along with their universal resource locator (URL) and geographic location.

4. A location tracking system in accordance with claim 3 further comprising a database of identifiable textual patterns corresponding to known host names and a geographical location corresponding to each one of said identifiable textual patterns.

5. A location tracking system in accordance with claim 4 wherein said database of identifiable textual patterns stores patterns corresponding to known host names, along with their corresponding cities and states abbreviations, so as to allow said tracking system determine the geographic location of a host node when host name of said node contains one of said identifiable textual patterns and at least one of said state and city abbreviations.

6. A location tracking system in accordance with claim 4 further comprising a database management module configured to estimate the geographical location of an end user IP address obtained by said trace engine module.

7. A location tracking system in accordance with claim 6 further comprising a web site coupled to said location tracking system so as to determine the geographical locations of end users who access said web site.

8. A location tracking system in accordance with claim 7 further comprising a URL switch configured to provide a URL address to an end user terminal who accesses said web site wherein said URL address is associated with the geographical location of said user terminal.

9. A location tracking system in accordance with claim 7 further comprising a database configured to store geographical locations of end user who accessed said web site so as to prepare corresponding reports.

10. A location tracking system in accordance with claim 1, wherein said server is a chat room server.

11. A location tracking system in accordance with claim 1, wherein said server is a newsgroup server.

12. A method for building a geographic location database of network nodes in a computer network comprising:

sending trace Id commands to a plurality of user terminals, wherein said user terminals are actively coupled to a server node so as to obtain IP address of each of said user terminals and its corresponding geographic location, storing in a first database, IP addresses obtained along with their corresponding geographical location; and storing in a second database, a set of physical connections between IP addresses obtained.

13. The method in accordance with claim 12, further comprising the step of retrieving information relating to geographic location of each of said user terminals from a user profile record, wherein said information was previously provided by a user of said user terminal.

14. The method in accordance with claim 13 further comprising the step of storing in said first database information corresponding to a plurality of Internet service providers along with their universal resource locator (URL) and geographic location.

15. The method in accordance with claim 14 further comprising the step of storing in a third database identifiable textual patterns corresponding to known host names and a geographical location corresponding to each one of said identifiable textual patterns.

16. The method in accordance with claim 15 further comprising the step of storing in said database of identifiable textual pattern, a list of geographical location abbreviations each corresponding to at least one of said textual patterns.

17. The method in accordance with claim 15 further comprising the step of storing in said database of identifiable textual patterns, domain name of company networks, along with their geographical locations wherein the network nodes of the company networks reside.

18. The method in accordance with claim 17 further comprising the step of determining the geographical locations of end users who access a web site.

19. The method in accordance with claim 14 further comprising the step of estimating the geographical location of an end user IP address obtained in response to said trace Id commands.

20. The method in accordance with claim 19 further comprising the step of providing a URL address to an end user terminal who accesses said web site wherein said URL address is associated with the geographical location of said user terminal.

21. The method in accordance with claim 12 further comprising the step of sending trace Id command to terminals communicating with a chat room server.

22. The method in accordance with claim 12 further comprising the step of sending trace Id commands to terminals communicating with a newsgroup server.

* * * * *

UNITED STATES PATENT AND TRADEMARK OFFICE
CERTIFICATE OF CORRECTION

PATENT NO. : 6,665,715 B1
DATED : December 16, 2003
INVENTOR(S) : Cyril Houri

It is certified that error appears in the above-identified patent and that said Letters Patent is hereby corrected as shown below:

Title page,
Item [73], Assignee, insert --Infosplit, Inc., New York, NY (US); Microsoft Corporation, Redmond, Washington (US) --

Signed and Sealed this

Fifth Day of October, 2004

JON W. DUDAS
*Director of the United States Patent and Trademark Office*